US009796251B2

(12) United States Patent
Kinsey

(10) Patent No.: US 9,796,251 B2
(45) Date of Patent: Oct. 24, 2017

(54) GOLF CART COVER QUICK-CLOSURE ACCESSORY

(71) Applicant: Kendall Kinsey Golf, LLC, Charlotte, MI (US)

(72) Inventor: Kendall James Kinsey, Charlotte, MI (US)

(73) Assignee: Kendall Kinsey Golf, LLC, Charlotte, MI (US)

( * ) Notice: Subject to any disclaimer, the term of this patent is extended or adjusted under 35 U.S.C. 154(b) by 0 days.

(21) Appl. No.: 15/076,823

(22) Filed: Mar. 22, 2016

(65) Prior Publication Data

US 2016/0288628 A1 Oct. 6, 2016

Related U.S. Application Data

(60) Provisional application No. 62/142,535, filed on Apr. 3, 2015.

(51) Int. Cl.
*B60J 5/04* (2006.01)
*B60J 11/04* (2006.01)
*B60J 5/06* (2006.01)

(52) U.S. Cl.
CPC ............ *B60J 5/047* (2013.01); *B60J 5/0487* (2013.01); *B60J 5/06* (2013.01)

(58) Field of Classification Search
CPC ............ B60J 5/047; B60J 5/0487; B60J 5/06
USPC ....................................... 296/146.9
See application file for complete search history.

(56) References Cited

U.S. PATENT DOCUMENTS

| 4,966,406 A | 10/1990 | Karasik et al. |
| 5,439,637 A | 8/1995 | Moyer |
| 6,439,637 B1 * | 8/2002 | Tyrer .......................... B60J 1/04 296/145 |
| 7,213,864 B2 * | 5/2007 | Gasper ....................... B60J 7/10 296/144 |
| 7,740,300 B2 | 6/2010 | Marsh et al. |
| 7,832,788 B2 | 11/2010 | Marsh et al. |

* cited by examiner

*Primary Examiner* — Joseph D Pape
*Assistant Examiner* — Dana Ivey
(74) *Attorney, Agent, or Firm* — Price Heneveld LLP

(57) ABSTRACT

An accessory is provided that attaches to an existing zippered golf cart. The accessory includes strips that zip-attach to the mating components of an existing zipper. The strips of the accessory include mating magnets that release upon outward pressure so that a door panel can be easily opened, yet the magnets magnetically automatically reattach when the door panel is released. This makes it exceptionally easy to ingress and egress the golf cart.

20 Claims, 4 Drawing Sheets

GOLF CART COVER QUICK-CLOSURE ACCESSORY

CROSS-REFERENCE TO RELATED APPLICATION

This application claims benefit under 35 USC §119(e) of Provisional Application Ser. No. 62/142,535, filed Apr. 3, 2015, entitled VERTICAL MAGNETIC DOOR STRIP ATTACHMENT, the entire contents of which are incorporated herein by reference.

BACKGROUND OF THE INVENTION

This invention relates to the field of soft covers for golf carts, and more specifically relates to an accessory for soft covers that allows faster and easier from egress and ingress into golf carts having a soft cover thereon.

Soft golf cart covers are often used by golfers to provide a wind break or weather shelter while riding in a golf cart when golfing. Generally, they include an enclosure-defining part that fits over and around the cabin-defining structure of the golf cart, clear panels for see through visibility, and opposing side-access door panels for passenger ingress/egress. There exist many different soft cover designs, but on most door panels there is a releasable mechanical closure mechanism (such as a zipper or snaps or hook-and-loop Velcro®) permitting the door panel to be opened for ingress and egress, but permitting it to be securely closed for tight fit (and weather resistance). However, in my opinion, the releasable mechanical closure mechanisms in the soft golf cart covers I'm aware of are cumbersome to operate, and often make the golfer's ingress and egress unnecessarily (and undesirably) slow and time consuming.

It is desirable to provide an accessory that improves this situation, and that is easy and quick to operate. Also, it is desirable to provide an accessory that does not require an owner to purchase an entirely new soft golf cart cover.

SUMMARY OF THE INVENTION

In one aspect of the present invention, an improvement is provided in a soft cover for a golfer-carrying golf cart, where the soft cover includes an enclosure part adapted to generally enclose the golf cart, a door panel coupled to the enclosure part, and a zipper with mating zipper components on adjacent edges of the enclosure part and the door panel for permitting zippered access into the enclosure part. The improvement comprises an accessory including two vertically-elongated strips, each strip having a zipper half member adapted to zip-attach to one of the mating zipper components, each strip also having a vertical arrangement of mating magnets positioned to magnetically attract when near each other. The mating magnets are separable by an outward push so that the door panel releases for easy exit or entrance by a golfer, but when released, the mating magnets automatically reattach and close to securely hold the door panel in a closed position.

In another aspect of the present invention, an accessory is provided for a golf cart cover, where the accessory includes two vertically-elongated strips, each strip having a half member adapted to mechanically attach to one of the mating components, each strip also having a vertical arrangement of mating magnets positioned to magnetically attract when near each other, the mating magnets being separable by an outward push so that the door panel releases for easy exit or entrance by a golfer, and that when released, automatically reattach and close to securely hold the door panel in a closed position.

In still another aspect of the present invention, a method includes providing a weather-blocking soft cover for a golfer-carrying golf cart, the soft cover including an enclosure part adapted to generally enclose the golf cart, a door panel coupled to the enclosure part, and a zipper with mating zipper components on adjacent edges of the enclosure part and the door panel for permitting zippered access into the enclosure part; providing an accessory including two vertically-elongated strips, each strip having a zipper half member, each strip also having a vertical arrangement of mating magnets positioned to magnetically attract when near each other; attaching each zipper half member to one of the mating zipper components with the mating magnets magnetically coupled together in a manner holding the door panel closed; separating the mating magnets with an outward push so that the door panel releases for easy exit or entrance by a golfer; and releasing the door panel so that the mating magnets automatically reattach and thus close to securely hold the door panel in a closed position against wind and weather.

An object of the present invention is to provide an accessory that makes it surprisingly quick and easy to open and close a door panel on a soft golf cart cover, where the door panel is designed to be held closed by a releasable mechanical closure mechanism such as a zipper, snap, or hook-and-loop Velcro®.

An object of the present invention is to provide an accessory that can be retrofittably installed on an existing soft golf cart cover, and that does not require an owner to purchase an entirely new soft golf cart cover.

More specifically, an object of the present innovation is to provide vertical magnetic strips in an accessory, where the accessory is attached to an existing soft cover using any method necessary along the vertical portions of the zippered door opening. For example, attachment as illustrated is by providing mating components on the magnetic strips that zip attach to zipper components on the adjacent edges of the existing soft golf cart cover. It is contemplated that attachment of the vertical strips to the golf cart cover can include different connecting mechanisms, such as zippers (as illustrated), or ring snaps, or two way separating zippers, or hook and loop fasteners.

An object of the present invention is to provide attachable magnetic strips with pocketed magnetic discs that allow the strips to automatically magnetically connect with a zipper like action when the door panel is released and moves by gravity to a relatively vertical position so that the strips are closely positioned, allowing the magnetic strips to self-close along the entire vertical door opening without further effort.

These and other features, advantages, and objects of the present invention will be further understood and appreciated by those skilled in the art by reference to the following specification, claims, and appended drawings.

DETAILED DESCRIPTION

Figure 1:
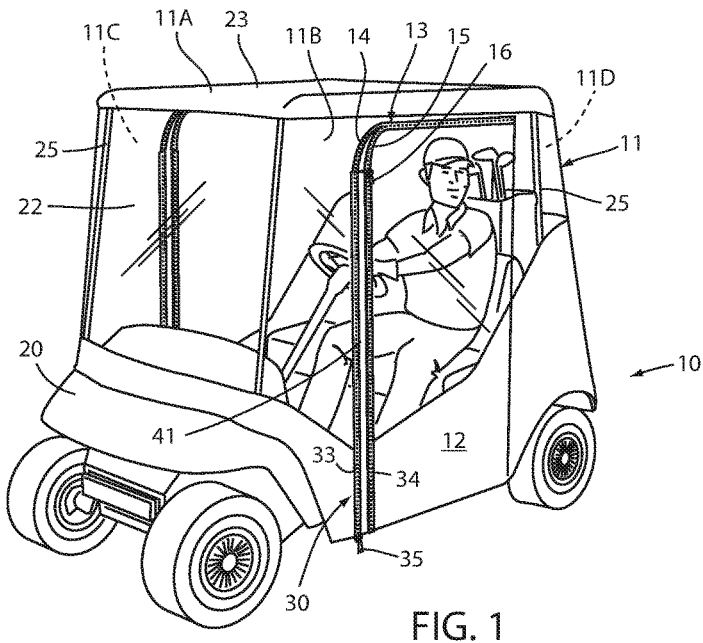
FIGS. 1-3 are perspective views of a golf cart covered with a soft cover, the soft cover having a door panel with zipper for securing it closed, but with an accessory zip-attached between the mating vertical zipper components of the zipper, the accessory including magnets magnetically attached to hold the door panel closed (FIG. 1), but that magnetically release with an outward push to allow easy opening of the door panel (FIG. 2), and that automatically magnetically reattached with a sequential zip-like action upon release of the door panel as the door panel moves to its vertical closed position (FIG. 3).
Figure 2:
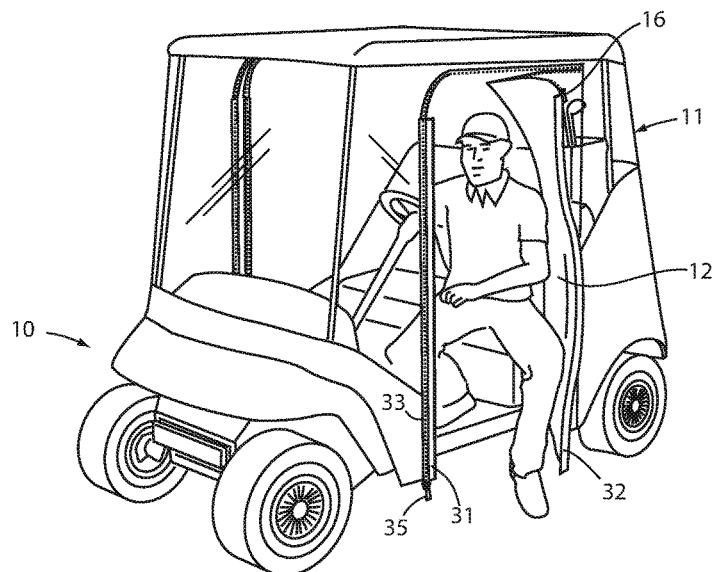

The present apparatus includes an accessory 30 (FIGS. 1-3) configured to attach to an existing zippered soft golf cart cover 11 installed on a golf cart 10. Advantageously, the accessory 30 can be purchased separately and retrofitably installed on the soft cover (11), or it is contemplated that the accessory 30 can be offered and sold as an option to new soft golf cart covers 11. The present accessory 30 makes it very quick and easy for a golfer to enter and exit a golf cart 10, since the accessory 30 allows the door panel 12 to open with a simple outward push, and to automatically reclose upon release of the door panel 12. This avoids the difficulty and cumbersomeness of known methods that would otherwise require repeatedly unzipping and then re-zipping to operate a door panel on a soft golf cart cover. Advantageously, the present accessory works surprisingly easily and efficiently without otherwise adversely affecting the tightness of the door panel retention and security offered by most known soft golf cart covers.

The present discussion relates generally to a golf cart 10 with existing soft cover 11 formed by flexible panels forming a top 11A, right 11B, left 11C, and rear 11D (loosely referred to herein as the "enclosure part"), with a door panel 12 attached to the right panel 11B (and to the left panel 11C) using a zipper 13. The zipper 13 includes zipper components 14 and 15 secured to adjacent vertically-extending edges of the right panel 11B and door panel 12, and includes a hand-grip zipping device 16 for zipping and unzipping the zipper components 14 and 15 so that a golfer can egress and enter the enclosure part while golfing. The golf cart 10 includes a body 20 supporting a seat, a windshield 22, and a roof 23 supported by roof-support bars 25. The existing soft cover 11 is configured to drop onto the enclosure part, with the door panel 12 positioned beside the seat, with the zipper 13 generally accessible by the driver/golfer.

The accessory 30 includes vertically-elongated strips 31 and 32, each with zipper half members 33 and 34 positioned for zipping attachment to the zipper components 14 and 15 respectively. One (or potentially both) of the zipper half members 33 and 34 includes a zipping device 35, depending on a position of and availability of the existing zipping device 16. Magnets 36 and 37 are held in pockets in the strips 31 and 32, respectively, and their magnetic poles are oriented so that they attract when the strips 31 and 32 are close to one another. The magnets are held in pockets 38 formed in the strips 31 and 32. It is contemplated that the magnets can be secured to the strips 31 and 32 by various means, but for example, the illustrated pockets are formed by the sheet fabric of the strips 31 (and 32) being folded back on itself and sewn together. Notably, instead of a sewn seam, the pockets could be releasably held closed by a snap or hook and loop material or other means.

Figure 3:
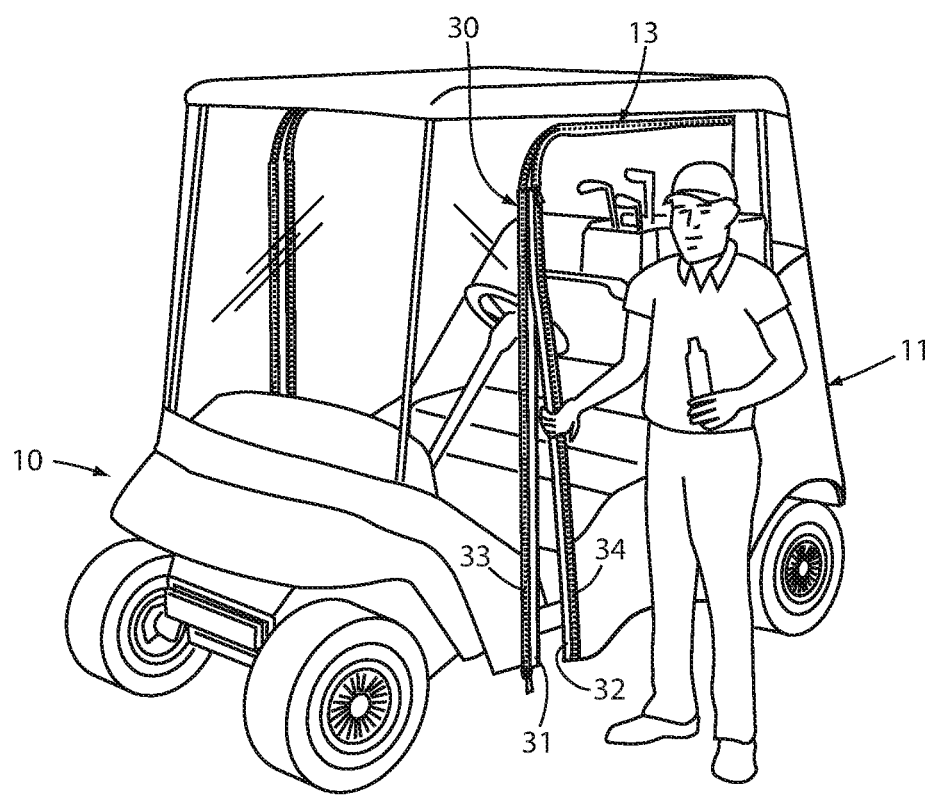
Figure 4:
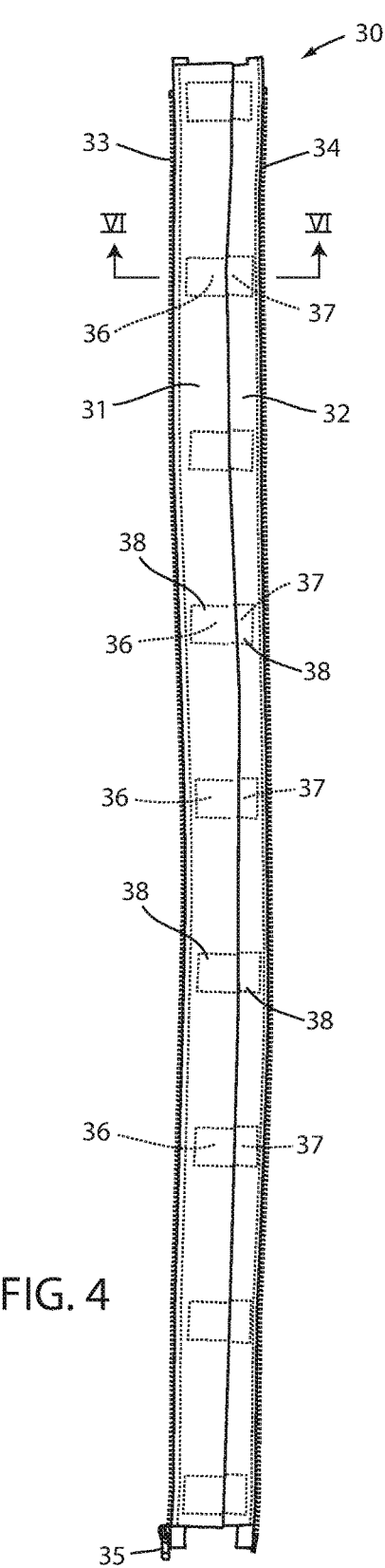
FIGS. 4-5 are side views showing the accessory of FIGS. 1-3, FIG. 4 showing the two strips of the accessory magnetically attached, FIG. 5 showing the two strips (and magnets) separated.
Figure 5:
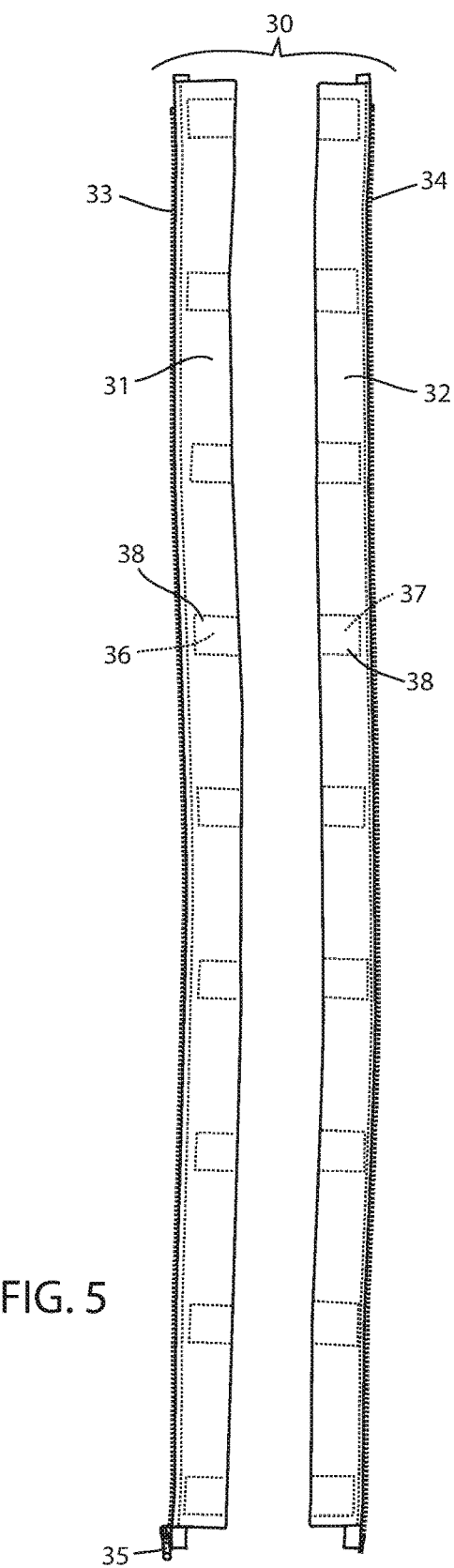
Figure 6:
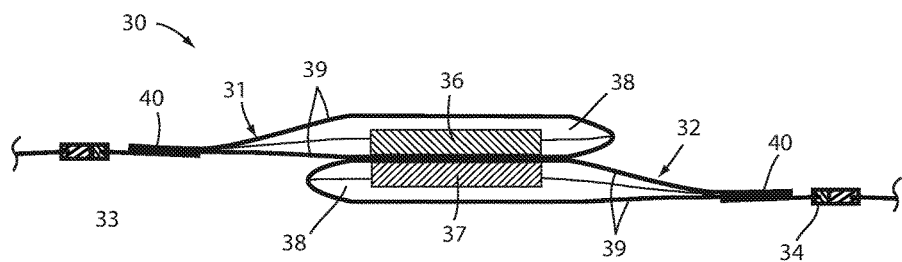
FIG. 6 is a cross-sectional view taken along lines VI-VI in FIG. 4.

In a preferred embodiment, the present accessory 30 (FIGS. 1-6) zips into existing zipper components 14, 15 of an existing zipper 13, with the accessory's parallel vertical strips 31, 32 each zip-attaching to an associated existing zipper component 14, 15 of the existing zipper 13, and with magnets 36, 37 in each of the parallel vertical strips 31, 32 being positioned for easy opening of the door panel 12 with a simple outward pressure of a few pounds pressure (FIG. 2), yet being designed to automatically re-close and re-attach when the door panel is aligned and released (FIG. 3). The illustrated accessory 30 is not fixedly/permanently attached to the illustrated soft golf cart cover, but instead can be unzipped and removed for replacement or repair (or storage if not needed). Thus, the accessory 30 can be retrofitably attached to the existing soft cover 11 or otherwise replaced as desired.

Figure 7:
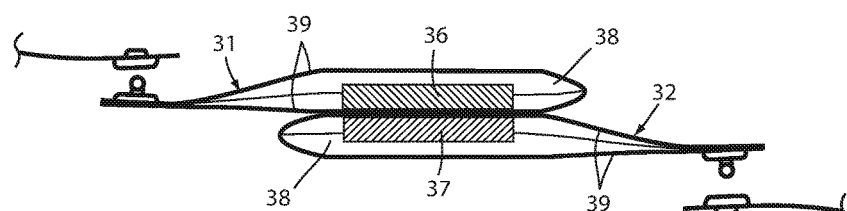
FIGS. 7-8 are cross-sectional views similar to FIG. 6 but showing modified embodiments including snap releasable attachments (FIG. 7) and hook-and-loop attachments (FIG. 8).
Figure 8:
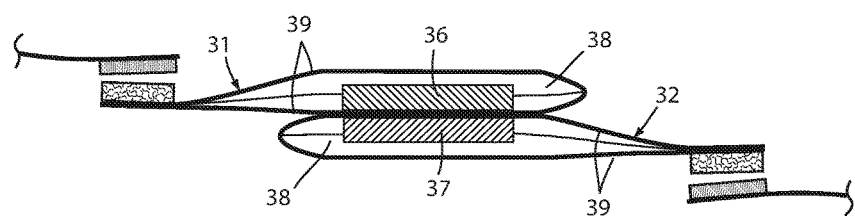

It is also contemplated that the present innovative accessory 30 can be adapted to work with many existing soft golf cart covers designs, such as ones where the existing soft covers includes releasable mechanical fasteners such as Velcro® hook and loop attachments (FIG. 8), mechanical snaps (FIG. 7), ring-and-hook (not shown), and/or other mechanical closure devices.

The illustrated strips 31, 32 (FIG. 5) are about 2-3 inches wide and extend a vertical length of the door panel as needed, such as about 36" to 48" tall. It is contemplated that they could be extended onto non-vertical portions of the existing zipper if desired. The illustrated strips 31, 32 are made of a durable sheet of material, such as "Rip Stop" Nylon, and the magnets 36, 37 are preferably a durable long-lasting magnet, such as a Neodymuim Rare Earth disc magnet of approximately ¾" in diameter. The magnets 36, 37 are held in pockets 38 formed by folded-back flaps 39 in the strips 31, 32, sewn along seams 40, and are positioned so that the north and south poles attract to each other when the strips 31, 32 fall by gravity to an adjacent position, with the magnets being preferably positioned approximately 6" apart on each strip. The strips 31, 32 are preferably approximately 3" wide and 47" tall.

It is contemplated that different strength magnets can be used, depending on particular functional requirements of an accessory. The illustrated magnets provide at least about 5 lbs. of pulling force (but preferably about 12 lbs force each so they combine to achieve a 25 lb. total closing force). This allows the golfer to easily open the door panel 12 with an outward push of significant but reasonable force, yet allows the magnets to hold the door panel securely closed. This also causes the magnets to sequentially re-attach with a zip-like action when a door panel is first aligned (i.e. top magnets aligned), and as the door panel flexes and moves toward a vertical position. The illustrated magnets re-attach with an audible snap, creating a distinctive series of snapping noises that golfers like, since it confirms good closure. The illustrated strips are attached to the golf cart cover at the two adjacent vertical edges of the enclosure part and the door panel of the soft cover, but it is contemplated that their relative position can be changed as needed for particular applications, such as to avoid a particular obstacle or structure on an existing golf cart or on an existing soft cover.

It is contemplated that the magnets can be permanently sewn into the strips by sewn seams (40, FIG. 6), or alternatively, the magnets can be held in pockets held closed by a releasable device such as hook-and-loop material (not specifically shown) so that they can be replaced. It is noted that the two strips are positioned with at least one flat surface of one of the strips being in a highly outwardly visible area on the golf cart (see FIG. 1), such that advertising or other indicia can be placed on the strip 31 (or 32) such as at location 41. The indicia could be, for example, a school or college color, or a significant statement or emblem or other indicia. It is also contemplated that the strips can include additional features, such as pockets shaped to hold golf balls, tees, or even a golf club (such as a putter) if desired. The strips can of course be made wider to facilitate placement of such additional features.

When the vertical magnetic door strip is attached to a zippered golf cart cover, it greatly speeds up (and makes easier) the process of getting in and out of the enclosure part of the golf cart, while still providing a very tight connection (i.e. good wind break) and weather shelter. For example, the present accessory allows a golfer to move from a sitting position within the soft golf cart cover to a standing position adjacent the golf cart within only a second or two. Contrastingly, using the zippers found in prior art, it may take several seconds for a golfer to unzip 30+ inches (or longer) of a zipper, all before the golfer can even begin to exit the golf cart. If the weather demands that the door panel be securely totally closed before the golfer can leave the golf cart to take a shot, the time and amount of distraction to the golfer can be considerable when using the zipper of the existing soft cover.

As an avid golfer, I find the present accessory to be amazing and very easy and quick to use. It only requires a simple outward push to release it (which takes only part of a second), and reattachment requires nothing more than simply aligning the top magnets and closing the door to allow all magnets to automatically reattach. Contrastingly, I find the process of constantly having to zip and unzip a door panel of many existing soft covers to be very distracting, taking away considerable focus and concentration on my golf game. Still further, I note that zippers often catch, twist, or snag, causing further delay and distraction as I fiddle with straightening out the zipper and then attempt to again pull the zipping device through the "difficult-to-zip" part of the zipper. Still further, the zippers in some known soft golf cart covers extend into awkward and difficult-to-reach areas, making the process of repeatedly zipping and unzipping even more cumbersome, awkward, time consuming, and generally distracting.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An improvement in a soft cover for a golfer-carrying golf cart, where the soft cover includes an enclosure part adapted to generally enclose the golf cart, a door panel coupled to the enclosure part, and a zipper with mating zipper components on adjacent edges of the enclosure part and the door panel for permitting zippered access into the enclosure part, the improvement comprising:
an accessory including two vertically-elongated strips, each strip being less than about three inches wide and having a zipper half member along a first edge constructed to zip-attach to one of the mating zipper components and also having a vertical arrangement of mating magnets along a second edge positioned to magnetically attract when near each other, the mating magnets and strips being separable by an outward push so that the door panel releases for easy exit or entrance by a golfer, and so that when released, the mating magnets automatically reattach and close to securely hold the door panel in a closed position.

2. An accessory for a soft cover for a golfer-carrying golf cart, where the soft cover includes an enclosure part adapted to generally enclose the golf cart, a door panel coupled to the enclosure part, and an access-permitting component with mating attachment components on adjacent edges of the enclosure part and the door panel that mechanically engage and release for permitting access into the enclosure part, the accessory comprising:
two vertically-elongated strips, each strip having a mechanically-closing half attachment member along a first vertical edge configured to mechanically attach to one of the mating attachment components and also having a vertical arrangement of mating magnets along a second vertical edge positioned to magnetically attract when near each other, the mating magnets being separable by an outward push so that the door panel releases for easy exit or entrance by a golfer, and so that when released, the mating magnets automatically reattach and close to securely hold the strips together and the door panel in a closed position.

3. The accessory of claim 2, wherein the half attachment member comprises a zipper half member shaped for zipping attachment to a zipper component.

4. The accessory of claim 2, wherein the half attachment member is a mechanical fastener selected from a group consisting of a zipper component, a snap component, and a hook-and-loop component.

5. The accessory of claim 2, wherein the strips are each less than about three inches wide.

6. The accessory of claim 5, wherein the magnets are positioned at least about four inches apart vertically on the strips.

7. The accessory of claim 6, wherein the strips are at least 30 inches long.

8. The accessory of claim 7, wherein the magnets have a magnetic holding force of at least about five pounds.

9. The accessory of claim 2, wherein the magnets are positioned at least about 4 inches apart vertically on the strips.

10. The accessory of claim 2, wherein the strips are at least 30 inches long.

11. The accessory of claim 2, wherein the magnets have a magnetic holding force of at least about five pounds.

12. The accessory of claim 2, wherein the magnets have a magnetic holding force of at least 25 pounds each.

13. A method comprising:
providing a soft cover for a golfer-carrying golf cart, the soft cover including an enclosure part adapted to generally enclose the golf cart, a door panel coupled to the enclosure part, and a zipper with mating zipper components on adjacent edges of the enclosure part and the door panel for permitting zippered access into the enclosure part;
providing an accessory including two vertically-elongated strips, each strip being less than about three inches wide and having a zipper half member along a first edge and also having a vertical arrangement of mating magnets along a second edge positioned to magnetically attract when near each other;
attaching each zipper half member to one of the mating zipper components with the mating magnets magnetically coupled together in a manner holding the door panel closed;

separating the mating magnets with an outward push so that the door panel releases for easy exit or entrance by a golfer; and releasing the door panel so that the mating magnets automatically reattach and thus close to securely hold the door panel in a closed position against wind and weather.

14. The method of claim 13, wherein the magnets reattach with an audible snap.

15. The method of claim 13, wherein the magnets reattach in a visible sequence having the appearance of a zipping action starting from the first magnets to reattach and then sequentially to adjacent magnets and the remainder of the magnets.

16. The method of claim 13, wherein the magnets each provide a magnetic holding force of at least 25 lbs. pulling force.

17. A method comprising:

providing a soft cover for a golfer-carrying golf cart, the soft cover including an enclosure part adapted to generally enclose the golf cart and including a door panel coupled to the enclosure part, the enclosure part including marginal material defining a door opening including a front edge of the door opening, and the door panel including mating material lying adjacent the front edge when in a closed position;

securing a vertical arrangement of mating magnets along the front edge of the door opening and also along the marginal material adjacent the front edge, with the mating magnets being positioned to magnetically attract when near each other to hold the door panel in the closed position, the mating magnets being positioned vertically about 6 inches apart and having a magnetic strength sufficient to cause an audible series of snapping noises when magnetically closing that confirms good closure to a cart rider;

separating the mating magnets with an outward force so that the door panel releases and opens for easy exit or entrance by a cart rider; and releasing the door panel so that the mating magnets automatically sequentially reattach with a distinctive snapping noise which confirms secure retention of the door panel in the closed position against wind and weather.

18. The method of claim 17, wherein the magnets include a magnetic strength of at least 5 pounds pulling force.

19. The method of claim 18, wherein the magnets include a magnetic strength of at least 12 pounds pulling force.

20. The method of claim 17, wherein the magnets are spaced vertically about 6" apart.

* * * * *